INVENTOR
HERMANN WINKLER

BY Craig & Antonelli

ATTORNEYS

United States Patent Office 3,504,681
Patented Apr. 7, 1970

3,504,681
STRATIFIED CHARGE ENGINE
Hermann Winkler, Stuttgart-Bad Cannstatt, Germany, assignor to Daimler-Benz Aktiengesellschaft, Stuttgart-Unterturkheim, Germany
Filed Jan. 11, 1968, Ser. No. 697,168
Claims priority, application Germany, Jan. 14, 1967,
D 52,013
Int. Cl. F02b 3/00, 75/02; F02d 39/02
U.S. Cl. 123—32                                    16 Claims

ABSTRACT OF THE DISCLOSURE

An injection-type internal combustion engine which operates with applied ignition and with a layer charge, in which the working piston is provided with a small recess or trough forming an auxiliary combustion space in the compression end position of the piston, whereby the recess or trough is located at a place of the piston bottom lying within the direction of the injected fuel just prior to the injection end and a spark plug is so arranged in the cylinder head above this recess as to cooperate with the auxiliary combustion space in the ignition of the relatively richer mixture present in the recess.

BACKGROUND OF THE INVENTION

Figure 1:
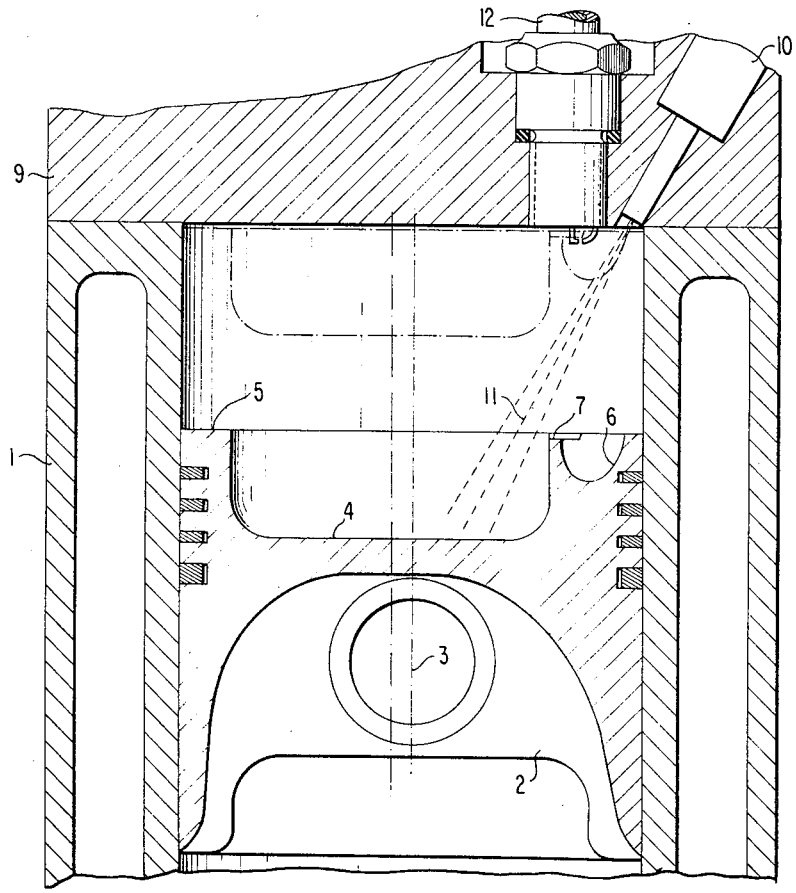

The present invention relates to an injection-type internal combustion engine having external auto-ignition or applied ignition and with layer charge, in which a small proportion of the fuel injected into the compression stroke is brought by special measures into direct proximity of a spark plug so that the ignition is transferred from a rich mixture within the area of the spark plug to an otherwise lean mixture which is not ignitable as such by the spark plug.

With the prior art layer or stratification charge systems, more or less costly measures, for example, an auxiliary combustion chamber in the cylinder head, an auxiliary nozzle or a special guidance of the gas flow and other measures were necessary heretofore for the most part for achieving a richer mixture at the spark plug, without, however, being able to assure the desired success in all cases.

SUMMARY OF THE INVENTION

The present invention is concerned with the aim to bring about a layer charge by another measure which is as simple as possible and as reliably effective as possible.

The underlying problems are solved in accordance with the present invention essentially in that the working piston of the aforementioned internal combustion engine is provided with a small recess or trough, forming within the area of the compression end position of the piston an auxiliary combustion space, at the place of its piston top which is located shortly prior to the injection end in the direction of the fuel jet injected obliquely to the cylinder axis and in that the spark plug is arranged in the cylinder head at the place of this auxiliary combustion space.

With such an injection arrangement the injected fuel jet initially coats a relatively large area of the piston top during the injection beginning and during the main portion of the injection corresponding to the still present piston movement toward the upper top dead-center position and produces together with the combustion air a desired lean mixture whereas the last portion of the injected fuel reaches the recess or trough forming the auxiliary combustion space which is disposed at that instant closely below the spark plug. As a result thereof, a sufficient rich mixture occurs thereat with great reliability which is reliably ignited by ignition of the spark plug taking place at that moment.

According to a preferred construction of the present invention, the recess or trough is arranged at a place of the rim area of the piston top and the piston is provided additionally with a conventional piston combustion space arranged adjacent the same with a spacing, into which the main quantity of the fuel is thus injected for the formation of the lean mixture.

According to a further feature of the present invention, the piston combustion space is arranged eccentrically toward that side of the piston opposite the recess and the recess is connected with the piston combustion space by way of a rim threshold which is disposed slightly lower as compared to the piston top.

According to a still further feature of the present invention, the recess or trough has a reniform shape matched to the circular shape of the rim area of the piston top receiving the same.

Accordingly, it is an object of the present invention to provide an externally controlled injection-type internal combustion engine with layer charge which effectively eliminates the aforementioned shortcomings and drawbacks encountered in the prior art.

Another object of the present invention resides in an externally controlled injection-type internal combustion engine in which a relatively richer mixture is attained in proximity to the spark plug without involving relatively costly measures.

A further object of the present invention resides in an internal combustion engine of the type described above which operates with applied ignition and reliably assures the desired starting and ignition success of the engine under all conditions.

Still another object of the present invention resides in an internal combustion engine of the type described above which permits the attainment of a layer charge with measures devoid of large expenditures which are as simple as possible and as reliably effective as possible.

Figure 2:
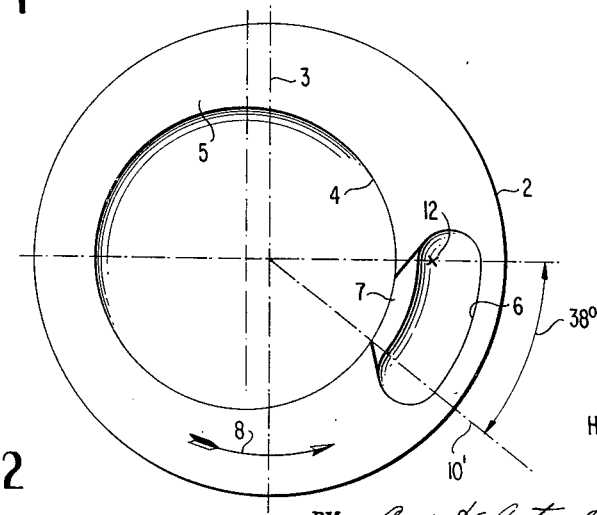

These and further objects, features, and advantages of the present invention will become more obvious from the following description when taken in connection with the accompanying drawing which shows, for purposes of illustration only, one embodiment in accordance with the present invention, and wherein:

FIGURE 1 is a schematic partial axial cross-sectional view through a working cylinder of an internal combustion engine in accordance with the present invention; and FIGURE 2 is a plan view on the working piston of the working cylinder illustrated in FIGURE 1.

Referring now to the drawing wherein like reference numerals are used throughout the two views to designate like parts, the illustrated internal combustion engine is provided in its working cylinder 1 with a piston 2 which, in turn, is provided with a piston combustion space 4 arranged eccentrically to the cylinder axis 3. The piston top 5 surrounding the piston combustion space 4 in an approximately annular shape, is provided in its area opposite the direction of eccentricity of the piston combustion space 4, with a reniform-shaped recess or trough 6 matched to the arcuate shape of the rim area, which recess 6 is connected with the piston combustion space 4 by way of a rim threshold 7 disposed slightly lower with respect to the piston top 5. The inlet channel (not shown) for the combustion air and the inlet valve (not shown) are so constructed in a conventional manner that the combustion air flowing into the cylinder space receives a vortexing or rotating motion in the direction of the arrow 8 of FIGURE 2.

An injection nozzle 10 is arranged in the cylinder head 9 of the internal combustion engine at a place located above the rear or trailing end area of the recess 6, as viewed in the direction of vortexing indicated by arrow 8, disposed, however, somewhat closer toward the edge of the cylinder space radially to the cylinder axis, which injection nozzle 10 injects the fuel into the cylinder space in a jet 11 directed obliquely toward the cylinder axis 3. The arrangement of the injection nozzle 10 is thereby made in such a manner that the fuel injected during the compression stroke of the piston 2 at first reaches directly the piston combustion space 4 and thereupon, during the further injection and the corresponding further upward movement of the piston 2, moves along the bottom of the piston combustion space 4 toward the recess 6 where it impinges finally just prior to the upper top dead-center position of the piston 2, against the rear or trailing end area of the recess bottom, as viewed in the direction of rotation 8 of the swirling air.

A spark plug 12 is arranged in the cylinder head 9 above the forward or leading end area of the recess 6 as viewed in the direction of the inflowing combustion air; the spark plug 12 still somewhat protrudes with its electrodes into the recess 6 in the upper top dead-center position of the piston 2.

During the operation of the described internal combustion engine, the fuel initially injected by the injection nozzle 10 forms within the piston combustion space 4 a very lean mixture, not ignitable as such by the spark plug 12. Just prior to the injection end and simultaneously just prior to its upper top dead-center position, the piston 2 in the working cylinder 1, however, moves so high that the last-injected fuel is injected directly into the recess 6, as can be seen from the upper dead-center position of the piston 2 indicated in dash and dot lines in FIGURE 1.

According to FIGURE 2, in which the nozzle axis 10' is indicated in dash and dot lines and forms an angle of 38° with the cylinder radius containing the spark plug 12, the fuel injected into the recess 6 reaches the rear or trailing area thereof as viewed in the direction of rotation 8 of the inflowing air, and impinges thereat against the bottom of the recess 6. The fuel is forcibly taken along in the circumferential direction of the piston 2 by the rotating combustion air and is again detached from the bottom of the recess 6 and evaporates so that it forms in the forward end area of the recess 6, as viewed in the direction of rotation 8 of the inflowing combustion air, such a rich mixture that a reliable ignition takes place thereat by means of the spark plug 12. The combustion then continues from the recess 6 by way of the rim threshold 7 into the piston combustion space 4 and ignites thereat also the lean mixture.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. An injection-type internal combustion engine with applied ignition and layer charge, in which a small proportion of the fuel injected into a main combustion space during the compression stroke is brought into direct proximity of a spark plug so that the ignition is transferred from a rich mixture within the area of the spark plug to an otherwise lean mixture not ignitable by the spark plug, and in which air is supplied to the main combustion space, characterized by fuel-injection means for injecting fuel from a single injection nozzle during the compression stroke into the main combustion space at a fixed angle obliquely to the cylinder axis, a working piston reciprocating in a cylinder and provided with a small recess in the piston top thereof within the area of the compression end position of the piston, said recess constituting an auxiliary combustion space formed substantially exclusively in the piston top at a place located on the same side relative to the cylinder axis as said injection nozzle and disposed, just prior to the end of the fuel injection from said single nozzle, in the direction of the fuel injected at said angle obliquely to the cylinder axis so that only the last portion of the total injected fuel is received by said auxiliary combustion space while the main portion of the injected fuel reaches the main combustion space, spark plug means in the cylinder head located within the area of said auxiliary combustion space, said recess being spaced from the cylinder wall by a rim portion of the piston top, and means for imparting a vortexing motion to the combustion air within said main combustion space in such a manner that it detaches the fuel injected into the auxiliary combustion chamber from the walls thereof and takes the detached fuel along in the direction of its vortex toward said spark plug means.

2. An internal combustion engine according to claim 1, wherein said recess is arranged at a place of the rim area of the piston top and the piston is provided with a piston combustion space arranged adjacent said recess and spaced therefrom.

3. An internal combustion engine according to claim 2, wherein the piston combustion space is arranged eccentrically toward the side of the piston opposite the recess.

4. An internal combustion engine according to claim 1, wherein said spark plug includes electrode means, said electrode means slightly protruding into said recess in the upper top dead-center position of the piston.

5. An internal combustion engine according to claim 1, characterized in that the volume of the auxiliary combustion space is only a small fraction of the volume of the main combustion space in the dead-center position of the piston.

6. An injection-type internal combustion engine with applied ignition and layer charge, in which a small proportion of the fuel injected into a main combustion space during the compression stroke is brought into direct proximity of a spark plug so that the ignition is transferred from a rich mixture within the area of the spark plug to an otherwise lean mixture not ignitable by the spark plug, and in which air is supplied to the main combustion space, characterized by fuel-injection means for injecting fuel during the compression stroke into the main combustion space obliquely to the cylinder axis, a working piston reciprocating in a cylinder and provided with a small recess in the piston top thereof within the area of the compression end position of the piston, said recess constituting an auxiliary combustion space formed substantially exclusively in the piston top at a place disposed, just prior to the end of the fuel injection, in the direction of the fuel jet injected obliquely to the cylinder axis so that only a portion of the injected fuel is received by said auxiliary combustion space while the main portion of the injected fuel reaches the main combustion space, spark plug means in the cylinder head located within the area of said auxiliary combustion space, said recess being spaced from the cylinder wall by a rim portion of the piston top, and means for imparting a vortexing motion to the combustion air within said main combustion space, said recess being arranged at a place of the rim area of the piston top and the piston being provided with a piston combustion space arranged adjacent said recess and spaced therefrom, the piston combustion space being arranged eccentrically toward the side of the piston opposite the recess, and the recess being connected with the piston combustion space by way of a rim threshold which is disposed slightly lower than the piston top.

7. An internal combustion engine according to claim 6, wherein said recess has an approximately reniform shape matched substantially to the arcuate shape of the rim area of the piston bottom receiving the same.

8. An internal combustion engine having injection nozzle means according to claim 5, wherein said recess is disposed with its trailing end area, as viewed in the direction of rotation of the in-flowing combustion air, at the impact place of the fuel jet of the injection nozzle means and is disposed with its leading end area under the spark plug.

9. An internal combustion engine according to claim 8, wherein said spark plug includes electrode means, said electrode means slightly protruding into said recess in the upper top dead-center position of the piston.

10. An internal combustion engine according to claim 6, wherein said spark plug includes electrode means, said electrode means slightly protruding into said recess in the upper top dead-center position of the piston.

11. An injection-type internal combustion engine with applied ignition and layer charge, in which a small proportion of the fuel injected into a main combustion space during the compression stroke is brought into direct proximity of a spark plug so that the ignition is transferred from a rich mixture within the area of the spark plug to an otherwise lean mixture not ignitable by the spark plug, and in which air is supplied to the main combustion space, characterized by fuel-injection means for injecting fuel during the compression stroke into the main combustion space obliquely to the cylinder axis, a working piston reciprocating in a cylinder and provided with a small recess in the piston top thereof within the area of the compression end position of the piston, said recess constituting an auxiliary combustion space formed substantially exclusively in the piston top at a place disposed, just prior to the end of the fuel injection, in the direction of the fuel jet injected obliquely to the cylinder axis so that only a portion of the injected fuel is received by said auxiliary combustion space while the main portion of the injected fuel reaches the main combustion space, spark plug means in the cylinder head located within the area of said auxiliary combustion space, said recess being spaced from the cylinder wall by a rim portion of the piston top, and means for imparting a vortexing motion to the combustion air within said main combustion space, and said recess having an approximately reniform shape matched substantially to the arcuate shape of the rim area of the piston top receiving the same.

12. An injection-type internal combustion engine with applied ignition and layer charge, in which a small proportion of the fuel injected into a main combustion space during the compression stroke is brought into direct proximity of a spark plug so that the ignition is transferred from a rich mixture within the area of the spark plug to an otherwise lean mixture not ignitable by the spark plug, and in which air is supplied to the main combustion space, characterized by fuel-injection means for injecting fuel during the compression stroke into the main combustion space obliquely to the cylinder axis, a working piston reciprocating in a cylinder and provided with a small recess in the piston top thereof within the area of the compression end position of the piston, said recess constituting an auxiliary combustion space formed substantially exclusively in the piston top at a place disposed, just prior to the end of the fuel injection, in the direction of the fuel jet injected obliquely to the cylinder axis so that only a portion of the injected fuel is received by said auxiliary combustion space while the main portion of the injected fuel reaches the main combustion space, spark plug means in the cylinder head located within the area of said auxiliary combustion space, said recess being spaced from the cylinder wall by a rim portion of the piston top, and means for imparting a vortexing motion to the combustion air within said main combustion space, said recess being disposed with its trailing end area, as viewed in the direction of rotation of the in-flowing combustion air, at the impact place of the fuel jet of the injection nozzle means and being disposed with its leading end area under the spark plug means.

13. An internal combustion engine according to claim 12, wherein said recess has an approximately reniform shape matched substantially to the arcuate shape of the rim area of the piston top receiving the same.

14. An injection-type internal combustion engine with applied ignition and layer charge, in which a small proportion of the fuel injected into a main combustion space during the compression stroke is brought into direct proximity of a spark plug so that the ignition is transferred from a rich mixture within the area of the spark plug to an otherwise lean mixture not ignitable by the spark plug, and in which air is supplied to the main combustion space, characterized by fuel-injection means for injecting fuel during the compression stroke into the main combustion space obliquely to the cylinder axis, a working piston reciprocating in a cylinder and provided with a small recess in the piston top thereof within the area of the compression end position of the piston, said recess constituting an auxiliary combustion space formed substantially exclusively in the piston top at a place disposed, just prior to the end of the fuel injection, in the direction of the fuel jet injected obliquely to the cylinder axis so that only a portion of the injected fuel is received by said auxiliary combustion space while the main portion of the injected fuel reaches the main combustion space, spark plug means in the cylinder head located within the area of said auxiliary combustion space, said recess being spaced from the cylinder wall by a rim portion of the piston top, and means for imparting a vortexing motion to the combustion air within said main combustion space, said spark plug means including electrode means, said electrode means slightly protruding into said recess in the upper top dead-center position of the piston, and said recess having an approximately reniform shape matched substantially to the arcuate shape of the rim area of the piston top receiving the same.

15. An injection-type internal combustion engine with applied ignition and layer charge, in which a small proportion of the fuel injected into a main combustion space during the compression stroke is brought into direct proximity of a spark plug so that the ignition is transferred from a rich mixture within the area of the spark plug to an otherwise lean mixture not ignitable by the spark plug, and in which air is supplied to the main combustion space, characterized by fuel-injection means for injecting fuel during the compression stroke into the main combustion space obliquely to the cylinder axis, a working piston reciprocating in a cylinder and provided with a small recess in the piston top thereof within the area of the compression end position of the piston, said recess constituting an auxiliary combustion space formed substantially exclusively in the piston top at a place disposed, just prior to the end of the fuel injection, in the direction of the fuel jet injected obliquely to the cylinder axis so that only a portion of the injected fuel is received by said auxiliary combustion space while the main portion of the injected fuel reaches the main combustion space, spark plug means in the cylinder head located within the area of said auxiliary combustion space, said recess being spaced from the cylinder wall by a rim portion of the piston top, and means for imparting a vortexing motion to the combustion air within said main combustion space, said spark plug means including electrode means, said electrode means slightly protruding into said recess in the upper top dead-center position of the piston, said internal combustion engine including injection nozzle means, and said recess being disposed with its trailing end area, as viewed in the direction of rotation of the in-flowing combustion air, at the impact place of the fuel jet of the injection nozzle means and being disposed with its leading end area under the spark plug means.

16. An injection-type internal combustion engine with applied ignition and layer charge, in which a small portion of the fuel injected into a main combustion space during the compression stroke is brought into direct proximity of a spark plug so that the ignition is transferred from a rich mixture within the area of the spark plug to an otherwise lean mixture not ignitable by the spark plug, and in which air is supplied to the main combustion space, characterized by fuel-injection means for injecting fuel during the compression stroke into the main combustion space obliquely to the cylinder axis, a working piston reciprocating in a cylinder and provided with a small recess in the piston top thereof within the area of the compression end position of the piston, said recess constituting an auxiliary combustion space formed substantially exclusively in the piston top at a place disposed, just prior to the end of the fuel injection, in the direction of the fuel jet injected obliquely to the cylinder axis so that only a portion of the injected fuel is received by said auxiliary combustion space while the main portion of the injected fuel reaches the main combustion space, spark plug means in the cylinder head located within the area of said auxiliary combustion space, said recess being spaced from the cylinder wall by a rim portion of the piston top, and means for imparting a vortexing motion to the combustion air within said main combustion space, said spark plug means including electrode means, said electrode means slightly protruding into said recess in the upper top dead-center position of the piston, said recess being arranged at a place of the rim area of the piston top and the piston being provided with a piston combustion space arranged adjacent said recess and spaced therefrom.

References Cited

UNITED STATES PATENTS

| | | | |
|---|---|---|---|
| 988,374 | 4/1911 | Newcomb | 123—32 |
| 3,079,901 | 3/1963 | Hallberg | 123—32 |
| 3,283,751 | 11/1966 | Goossak et al. | 123—32 |
| 3,304,922 | 2/1967 | Hideg | 123—32 |
| 3,315,650 | 4/1967 | Bishop et al. | 123—32 |

LAURENCE M. GOODRIDGE, Primary Examiner

U.S. Cl. X.R.

123—75